No. 626,932. Patented June 13, 1899.
W. F. REED & W. O. S. PIPER.
PIPE JOINT AND HOSE COUPLING.
(Application filed Dec. 16, 1898.)
(No Model.)
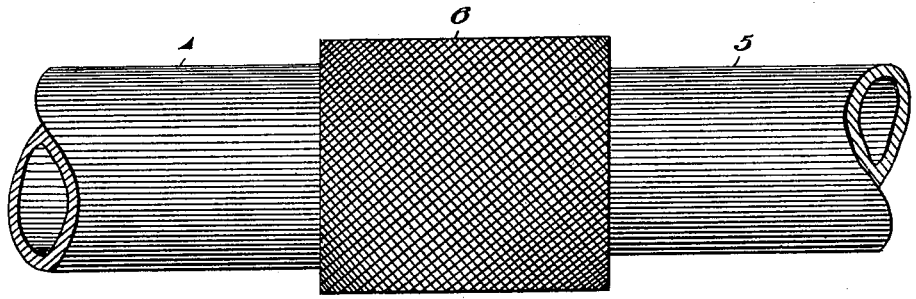
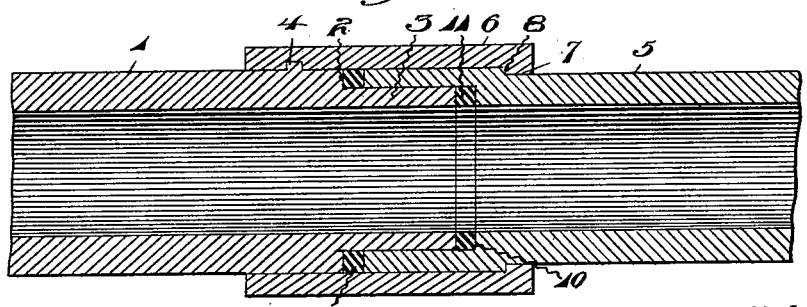
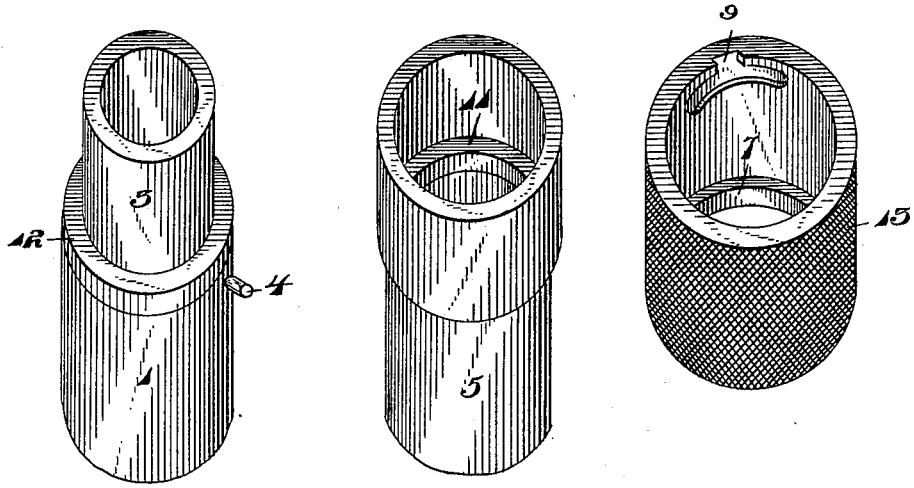
WITNESSES:
J. P. Appleman
N. L. Bogan
INVENTORS
W. F. Reed.
W. O. S. Piper.
BY
H. C. Eout & Co
ATTORNEYS.

UNITED STATES PATENT OFFICE.

WILLIAM F. REED AND WILLIAM OTTO STALEY PIPER, OF BELLAIRE, OHIO.

PIPE-JOINT AND HOSE-COUPLING.

SPECIFICATION forming part of Letters Patent No. 626,932, dated June 13, 1899.

Application filed December 16, 1898. Serial No. 699,488. (No model.)

*To all whom it may concern:*

Be it known that we, WILLIAM F. REED and WILLIAM OTTO STALEY PIPER, citizens of the United States of America, residing at Bellaire, in the county of Belmont and State of Ohio, have invented certain new and useful Improvements in Pipe-Joints and Hose-Couplings, of which the following is a specification, reference being had therein to the accompanying drawings.

Our invention relates to certain new and useful improvements in pipe-couplings.

Our invention has relation to sewer or other pipes of like character formed of material more or less vitrified, and especially does it relate to that construction of such pipes whereby one section is coupled by being coupled with an extra joining.

Our invention further relates to an improved coupling adapted to have secured thereto a nozzle.

Our invention is further applicable in all cases where it is desired to have an adjacent member quickly and easily coupled thereto.

Heretofore in this class of couplings the union of one section with the other has commonly been made by simply introducing the smaller end of one a short distance into the larger end of the next, a considerable space being left between the two parts, these parts being secured together in most cases by means of the smaller member being exteriorly screw-threaded and the larger member interiorly screw-threaded, which would necessitate a considerable outlay of time. To obviate these objectionable features and other imperfections and to produce a simple, cheap, effective, and durable coupling for pipes or other objects and which coupling may be easily and perfectly operated are the chief objects of our invention, and to accomplish this our improvements involve a new and useful form of coupling, as will be herein first fully described and the particular features of the invention then pointed out in the claims.

In describing the invention in detail reference is had to the accompanying drawings, forming a part of this specification, wherein like numerals of reference indicate corresponding parts throughout the several views thereof, and in which—

Figure 1 is a side view of two members of a pipe coupled by our improved device. Fig. 2 is a longitudinal sectional view thereof. Fig. 3 is a perspective view of one of the members, showing a lug formed on the periphery thereof for securing the same in position. Fig. 4 is a perspective view of one of the members, showing our improved swivel connection for coupling attached thereto. Fig. 5 is a perspective view of our improved swivel connection or collar.

Referring to the drawings by reference-numerals, 1 indicates a section or member of a pipe, which is cut away, as at 2, forming a portion thereof, as at 3, of less diameter than the other portion of the pipe. In this form of pipe, as shown, the bore thereof is of the same diameter throughout, although the circumference of the portion 3 is less than the portion marked 1.

4 indicates a fastening-lug for securing the same in the desired position.

5 indicates a section of the adjacent member, which is adapted to have mounted thereon a swivel-collar 6. This swivel-collar 6 is provided with an inward-extending flange 7, which abuts against the shoulder 8, formed on the member 5. This shoulder 8 also acts as a stop for the collar 6 when it is desired to couple thereto the adjacent member 1. The collar 6 is provided on its inner face with a recess 9, substantially T shape in contour.

The inner face, at the one end thereof, of the member 5 is cut away, as at 10, thereby making the same of greater diameter than the other portion of the member 5. This cut-away portion is adapted to receive the portion 3 of the member 1, so that when the member 1 is in position the bores of the two members are of the same diameter throughout their entire length.

11 indicates a washer which is mounted at the end of the cut-away portion 10, and 12 also indicates a washer which is mounted on the shoulder 2 of the member 1.

The collar 6 is milled or knurled on its outer periphery, as at 13, to allow of the easy grip of the fingers when operating the same.

The operation of our improved coupling is as follows: The washers being in position the fastening-lug 4 of the member 1 is inserted in the opening formed on the inner face of the collar and then turned in either direction, which securely holds the two sections together.

It will be noted that various changes may be made in the details of construction without departing from the general spirit of our invention.

Having thus fully described our invention, what we claim as new, and desire to secure by Letters Patent, is—

1. In a pipe-coupling, the combination with the two engaging sections one of which has a reduced end and the other of which has an enlarged end to receive said reduced end of the engaging section, washers interposed between the abutting ends of the sections, a swivel-collar engaging each of said sections and having an integral flange abutting against the enlarged end of the one section, said swivel-collar being provided on its inner face with a substantially T-shaped groove, and the section having the reduced end carrying a lug adapted to engage in said T-shaped groove to lock the two sections together, substantially as herein shown and described.

2. The combination of the section 1, having a part of its periphery cut away, thereby forming a portion of less circumference, a washer mounted on the said smaller portion of the section 1, the section 5, having a portion thereof enlarged, said enlarged portion cut away on its inner face and adapted to receive the said smaller portion of the section 1, a washer arranged in said cut-away portion of the section 5, adapted to abut against the ends of the smaller portion of the section 1, a collar mounted on the larger portion of the section 5, said collar provided with a T-shaped groove adapted to engage the said lug and secure the two sections together, substantially as shown and described.

3. The combination of the section 1, having a part of its periphery cut away thereby forming a portion of less circumference, a washer mounted on the said smaller portion of the section 1, the section 5, having a portion thereof enlarged, said enlarged portion cut away on its inner face and adapted to receive the said smaller portion of the section, 1, a washer arranged in said cut-away portion of the section 5, adapted to abut against the ends of the smaller portion of the section 1, a lug formed on the periphery of the larger portion of the section 1, a collar mounted on the larger portion of the section 5, said collar provided with a T-shaped groove adapted to engage the said lug and secure the two sections together, and means arranged on the said section 5 for securing the collar in position when the same engages the lug formed on the section 1, substantially as shown and described.

In testimony whereof we affix our signatures in the presence of two witnesses.

WILLIAM F. REED.
WILLIAM OTTO STALEY PIPER.

Witnesses:
R. HERBERT FERREN,
JOHN W. MORRELL.